Oct. 11, 1932.    W. NOBLE    1,881,881

HEATING ELEMENT

Filed May 21, 1929

Inventor
Warren Noble.

By Stanley Lightfoot
Attorney

Patented Oct. 11, 1932

1,881,881

UNITED STATES PATENT OFFICE

WARREN NOBLE, OF DETROIT, MICHIGAN, ASSIGNOR TO ELECTROMASTER, INC., OF DETROIT, MICHIGAN, A CORPORATION OF MICHIGAN

HEATING ELEMENT

Application filed May 21, 1929. Serial No. 364,910.

This invention relates to electric burners, more particularly intended for use in the cooking tables of electric ranges, and preferably for use in combination with reflectors as more particularly described in my copending application, Serial No. 363,594, filed May 16, 1929; and has for its object to provide a burner of high efficiency in which a minimum of heat absorption or loss in the burner itself will occur, whereby electric energy supplied to the burner will be available as heat in a high degree with a minimum loss of time, so that the burner will be characterized by its speed in coming up to its maximum heat when it is turned on. In electric ranges this feature is especially valuable, as at present one of the greatest drawbacks to the use of electric ranges is the fact that they are very slow in operation, and, where a cold burner is turned on, considerable waste of time is entailed in waiting for the burner to come up to maximum heat with incidental expense resulting from the consumption of current over such heating period. Consequently, efficiency from a cooking standpoint, as well as from merely a technical standpoint is an aim of this invention.

It is also an object of the invention to provide a type of burner which may be readily removed and replaced in its mounting or socket by the user, and which may be manufactured, sold, and installed at very low cost.

A further object is to provide a burner of light construction with a minimum of porcelain or refractory having adequate strength together with self-adaptation to expansion and contraction under changes in temperature, whereby the tendency of the porcelain or refractory to crack under such changes in temperature will be reduced to a minimum, even to the extent that cold fluids may be spilt on a hot burner without resultant damage thereto. In order to incorporate his feature as an inherent property, it is proposed to provide a hollow cone on which the heating element is mounted, and to mount this cone on a suitable support in such a manner as to form what may be termed a floating lock between the said cone and its support, whereby the cone will be substantially free of compression stresses, such as would otherwise promote fracture of the cone under conditions of expansion and contraction.

A further object is to provide a minimum amount of porcelain or refractory carrying the heating element of the burner, and connected, but not integrally so, with further supporting means in a manner providing a heat dam between the element supporting refractory and said further supporing means for the purpose of heat conservation. A further object of the invention is to provide an air chamber within the cone as a means further resisting the transfer of heat from said cone to its support and as a means also resisting the transfer of heat from said cone to conductors located therewithin.

The invention further contemplates the provision of a refractory cone on which is mounted a heating element, a support for the cone, and a base or socket for receiving and supporting the cone and its support, the cone and its support being anchored together and insertable as a unit into the base or socket. The base or socket and the support of the cone may be and preferably are drawn tightly together to close contacts carried thereby without impairing the relationship hereinbefore referred to between the cone and its support; so that an object of this arrangement may be said to comprise the provision of a compression lock between the base or socket and the cone support, and a lock for the cone and its support substantially free from compression.

A still further object of the said invention resides in the provision for somewhat resilient electrical connections between the base or socket and the cone support, which connections when subjected to slight compression complete electrical contacts for the passage of current to the heat element. And it is a still further object to utilize these contacts as means for aligning and maintaining the cone support and the base or socket in their required relationship.

Still further objects or advantages subsidiary or incidental to the aforesaid objects, or resulting from the construction or operation of the invention as it may be carried into effect, will become apparent as the said invention is hereinafter further disclosed.

In carrying the said invention into effect, I may provide a hollow refractory cone, spirally grooved on its exterior surface to receive a heating element, a refractory or similar support for the cone and entered into its base in spaced marginal relation thereto, said support and said cone interengaging to provide a non-rotative connection therebetween, axial means, which may be one of the conductors for the heating element, also connecting the top of said cone with said support to prevent longitudinal displacement of said cone from said support, but adapted to substantially avoid compression of said cone on said support whereby the nature of the connections of said cone to its support permits freedom of expansion and contraction of said cone due to temperature changes, and a base or socket receiving said support, said socket containing contact members and said support carrying conductors engaging said contact members and housed within said hollow cone.

All of which is more particularly described and ascertained hereinafter, by way of example, having reference to the accompanying drawing, wherein.

Figure 2:
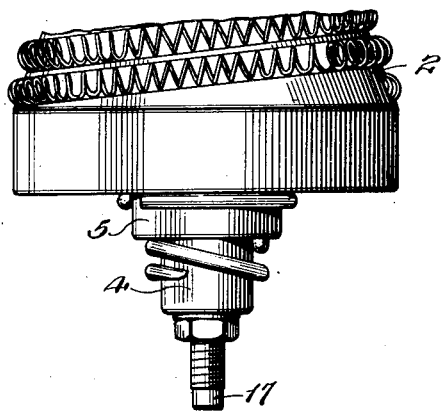
Figure 2 is a fragmentary elevation of the lower part of the burner.
Figure 1:
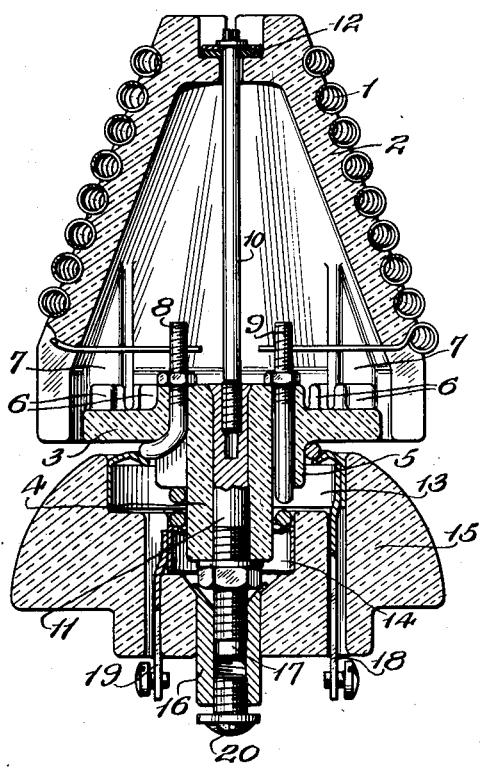
Figure 1 is a vertical sectional view of the improved burner and socket.
Figure 3:
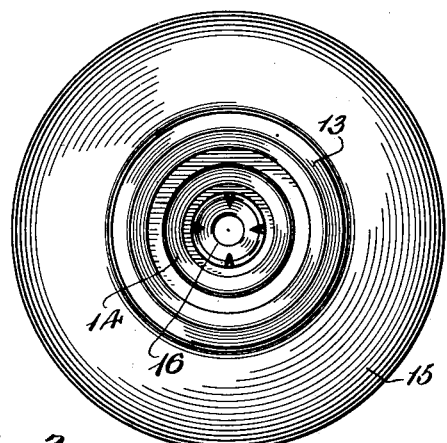
Figure 3 is a plan of the burner socket.

The heating element 1 of the burner is shown as being mounted on a refractory cone 2 tapering towards its upper end and having a minimum wall thickness so that its specific heat as a whole will be quite low, the lower end of the said cone being open and of larger internal diameter than the porcelain or refractory support 3 which is received therein. This support is shown as being in the form of a disc having a downwardly projecting stem 4 which has a portion of increased diameter 5 adjacent the said disc, and on the upper surface of the disc are pairs of stops 6 which receive therebetween lugs or projections 7 formed on the interior of the said cone 2, whereby the said cone is locked in non-rotative relation to the support 3, but in a manner permitting free radial expansion and contraction of the said cone about its said support.

The support carries conductors 8, 9 and 10 to which the heating element 1 of the burner is suitably connected, these conductors being located in assembly within the hollow cone and materially spaced from the walls thereof except in so far as the upper end of the central conductor 10 extends through the upper end of the cone, and this central conductor 10 also operates as a securing means for the cone 2 and its support 3 by being threaded at its lower end into a member 11 fixedly mounted axially of the said support 3, the said conductor thus operating as a bolt to secure the said cone against longitudinal displacement of the support 3 and being proportioned so that when screwed home into the member 11, it does not materially compress the said cone on its support, but even permits freedom of elongation of the cone by expansion when heated. To this end, a more or less resilient washer 12, such as of asbestos, may be inserted between the head of the conductor 10 and the end portion of the cone. The said cone is consequently secured in what might be termed a floating manner on its support and is free of compressive or other strains which might ordinarily tend to result in fracture of the cone upon expansion and contraction, due to heating and cooling.

Furthermore, the nature of the connection of the cone to its support affords a minimum transfer of heat from the said cone to the support 3 and a resulting economy of heat; so that upon supply of current to the heating element of the burner the said burner will very quickly come up to its full heat which is highly desirable in such apparatus as electric cooking ranges to which it is especially adapted.

The air space within the cone also protects the connections to the conductors and the conductors themselves, as well as minimizes loss of heat from the burner through the said conductors, and it further serves as an insulation to prevent loss of heat internally of the refractory cone 2 especially to the said support 3.

As has been stated, the stem of the support 3 is of larger diameter adjacent the support than towards its lower end, and the conductor 8 extends through the disc of the said support and has its lower portion coiled around the larger diameter of the said stem whilst the conductor 9 similarly extends through the said support and has its lower end coiled around the lesser diameter of the said stem, as clearly shown in Figure 2. These coiled portions of the two conductors are adapted to seat on the inturned flanges of ring contacts 13 and 14, respectively, carried by a base member or socket 15 preferably of porcelain suitably recessed to accommodate the said ring contacts.

The lower end of the member 11 carried by the stem of the said support 3 projects beyond the end of the said stem and is threaded to engage in a non-rotatable nut 16 mounted in the lower part on the said porcelain; so that the burner comprising the said cone and its base may be mounted in the said socket or dismounted therefrom by simply screwing or unscrewing it into or out of the socket as in the manner of the application to and removal of an electric light bulb from its socket, as will be clearly apparent. The lower end of the said member may be in the form of the pilot 17 facilitating its proper insertion into the nut 16 of the socket.

18 and 19 are suitable terminals extending upwardly through the base of the socket to the ring contacts 13 and 14, respectively, for wiring purposes, and the nut 16 is provided with means 20 for the attachment of a wire thereto, whereby electrical connection through the member 11 to the conductor 10 of the burner will be established when the burner is inserted in the socket in the manner described.

It is preferred that a certain resiliency in the flanges of the contacts 13 and 14 be provided in order to insure efficient seating of the lower ends of the contacts 8 and 9 thereon when the burner is screwed home in its socket, and also to provide a certain locking action insuring a firm interlocking of the said burner in its threaded engagement with the socket as will be well understood.

This invention may be developed within the scope of the following claims without departing from the essential features of the said invention, and it is so desired that the specification and drawing be read as being merely illustrative, and not in a limited sense, except as necessitated by the prior art.

What I claim is:

1. In an electric burner, a refractory hollow cone having a spiral groove in the exterior surface thereof for the reception of a heating element, a support for said cone, a lug on the interior of said cone for supporting said cone on said support, and means on said support for snaring said lug to restrain said cone against rotation with respect to said support.

2. In an electric burner, a refractory hollow cone having a spiral groove in the exterior surface thereof for the reception of a heating element, a support for said cone, projections on the top of said support having recesses therein, and projections integral with said cone extending interiorly thereof for fittingly engaging said recesses whereby said cone is rotatively fixed with respect to said support.

3. In an electric burner, a refractory hollow cone having a spiral groove in the exterior surface thereof for the reception of a heating element, a support for said cone having a smaller diameter than the interior of said cone at the outer end thereof, and projections internally of said cone for supporting said cone on said support in such manner as to permit a free flow of air interiorly of said cone.

4. In an electric burner, a refractory hollow cone having a spiral groove in the exterior surface thereof for the reception of a heating element, a support for said cone having a smaller diameter than the interior diameter of the outer end of said cone, a plurality of lugs circumferentially spaced around the top of said support and having depressions therein, projections on said cone protruding inwardly therein for engaging with the depressions in said lugs whereby said cone is supported by said support in a rotatively fixed engagement in such manner as to permit passage of air interiorly of said cone.

5. In an electric burner, a refractory hollow cone having a spiral groove in the exterior surface thereof for the reception of a heating element, a support for said cone having a smaller diameter than the interior of said cone at the outer end thereof, projections internally of said cone for supporting said cone on said support in such manner as to permit a free passage of air to the interior of said cone, and means for securing said cone and said support against relative displacement.

6. In an electric burner, a refractory hollow cone having a spiral groove in the exterior surface thereof for the reception of a heating element, a support for said cone having a smaller diameter than the interior of said cone at the outer end thereof, projections internally of said cone for supporting said cone on said support in such manner as to permit a free passage of air to the interior of said cone, and adjustable means for locking said cone and said support in substantially fixed relation with respect to undue longitudinal displacement.

7. In an electric burner, a refractory hollow cone having a spiral groove in the exterior surface thereof for the reception of a heating element, a support for said cone having a smaller diameter than the interior of the outer end of said cone, a plurality of lugs circumferentially spaced around the top of said support and having depressions therein, projections internally of said cone for engaging the depressions in said lugs whereby said cone rests on said support in an engagement fixed against relative rotation in such manner as to permit a free flow of air to the interior of said cone, and means for maintaining said lugs in said depressions whereby said cone rests upon said support in locked engagement free of compression.

8. In an electric burner, a refractory hollow cone having a spiral groove in the exterior surface thereof for the reception of a heating element, a support for said cone having a smaller diameter than the interior of the outer end of said cone, a plurality of lugs circumferentially spaced around the top of said support and having depressions therein, projections internally of said cone for engaging the depressions in said lugs whereby said cone rests on said support in an engagement fixed against relative rotation in such manner as to permit a free flow of air to the interior of said cone and a threaded bolt extending axially through said cone, the head of said bolt abutting a shoulder interiorly of said cone, the threaded portion of said bolt screwing into said support to maintain the projections in said cone in engagement with the depressions in said lugs whereby said cone rests upon said support in locked engagement therewith.

9. In a combination, an electric burner having a heating element, a hollow refractory cone having a spiral groove in the surface thereof for the reception of said element, a support for said cone, a shouldered member extending through said support, adjustable means for anchoring said cone to said member whereby said cone is secured thereto without being subjected to compression, a base for said support, and means for anchoring said member to said support, said anchoring means also drawing the shoulder of said member against said support whereby said cone, said support and said base are held in fixed engagement.

10. In an electric burner, a heating element, a hollow refractory cone having a spiral groove in the surface thereof for the reception of said element, a support for said cone, a bolt extending axially of said cone, the head of said bolt abutting a shoulder on said cone, the threaded end of said bolt engaging said support for maintaining said cone and said support in fixed relation, a base for said support, and means for locking said support to said base independently of said bolt whereby said cone is free of compression stresses imparted to said base and said support by said means.

11. In combination, an electric burner having a heating element, a hollow refractory cone having a spiral groove in the surface thereof for the reception of said element, a support for said cone having a smaller diameter than the interior of the outer end of said cone, projections internally of said cone for abuttingly engaging said support whereby a free air passage is provided to the interior of said cone, means for locking said cone and said support in a substantially floating engagement whereby said cone is free from compression stresses, a base for said support, and means for rigidly securing said support and said base together to provide a sturdy assembly comprising the cone, the support and the base.

12. In an electric burner, a heating element, a hollow refractory cone having a spiral groove in the surface thereof for the reception of said element, a support for said cone having a smaller diameter than the interior of the outer end of said cone, projections internally of said cone for abuttingly engaging said support whereby a free air passage is provided to the interior of said cone, a bolt extending axially of said cone, the head of said bolt abutting a shoulder on said cone, the threaded end of said bolt engaging said support for maintaining said cone and said support in fixed relation, a base for said support, and means for locking said support to said base independently of said bolt whereby said cone is free of compression stresses imparted to said base and said support by said means.

13. In combination, an electric burner comprising a heating element, a refractory cone having a groove in the exterior surface thereof for the reception of said element, and a support for said cone having terminals therethrough for attachment to the ends of said coil, a base for said cone and said support having lead lines extending therethrough, a metallic ring surrounding an extension on said support, one of said terminals comprising a heavy wire extending vertically downward through said support and coiling around the extension thereon, the coil of said terminal forming a resilient contact with said ring whereby a proper electrical connection is provided therebetween, and means for securing said base and said support in fixed relation.

14. In an electric burner, a heating element, a hollow refractory cone having a spiral groove in the surface thereof for the reception of said element, a support for said cone having a hollow projection extending downwardly therefrom, a bolt extending through and anchored to said support, said bolt being threaded internally at the upper end thereof, a second bolt extending axially of said cone, the head of said second bolt abutting a shoulder internally of said cone, the threaded end of said second bolt engaging the internal threads on the first-named bolt for anchoring said cone to said support, and a base for said support, said first named bolt at its lower end being adapted to screw into said base for supporting said support and said cone thereon.

15. In an electric burner, a heating element, a hollow refractory cone having a spiral groove in the surface thereof for the reception of said elements, a support for said cone having a hollow projection extending downwardly therefrom, a bolt extending through and anchored to said support, said bolt being threaded internally at the upper end thereof, a second bolt extending axially of said cone, the head of said second bolt abutting a shoulder internally of said cone, the threaded end of said second bolt engaging the internal threads on the first-named bolt for anchoring said cone to said support, a base for said support, said first-named bolt at its lower end being adapted to screw into said base for supporting said support and said cone thereon, and means for piloting said bolt into said base to insure a proper engagement of threads.

16. In an electric burner, a heating element, a hollow refractory cone having a spiral groove in the surface thereof for the reception of said element, a support for said cone having electric lead lines extending therethrough for attachment to said element, a projection on said support depending axially therefrom, a metallic bolt extending through said projection and said support and anchored thereto, said bolt being threaded internally at its upper end, a second metallic bolt extending axially through said cone, said second bolt abutting a shoulder internally of said cone and forming a terminal for the upper ends of said element, the threaded end of said second bolt screwing into the internal threads of said first-named bolt for securing said cone to said support, a base for said support having electric lead lines extending therethrough for engagement with the lead lines carried by said support, a metallic internally threaded collar extending through said base and anchored thereto, said collar having an attachment thereon for connection to a source of electric energy, said first-named bolt screwing into said collar for fixing said cone and said support on said base and for completing an electrical circuit through said coils.

17. In an electric burner, a heating element, a hollow refractory cone having a spiral groove in the surface thereof for the reception of said elements, a support for said cone having electric lead lines extending therethrough for attachment to said elements, a projection on said support depending axially therefrom, one of said lead lines coiling around said projection near said support, the other of said lead lines coiling around said projection in spaced relation from the first-named lead line, a metallic bolt extending through said support and said projection and anchored thereto, said bolt being threaded internally at its upper end, a second metallic bolt extending axially through said cone, said second bolt abutting a shoulder internally on said cone and forming a terminal for the upper part of said element, the threaded end of said second bolt screwing into the internal threads of said first-named bolt for screwing said cone to said support, a doubly countersunk base for said support having a central bore therethrough, a metallic ring having an internal rim thereon fitting the outer countersunk bore of said base and forming a resilient electrical contact with the upper coiled lead line, a second metallic ring having an internal rim fitting the lower of said countersunk bores and forming a resilient electrical contact with the lower of the coils around said projection, individual electrical connections from a source of electrical energy to each of said rings, an internally threaded metallic collar extending through said central bore and anchored on either end thereof, said first-named bolt screwing into said collar, and means for connecting said collar to a source of electrical energy, said first-named bolt and said collar cooperating with the coils around said projection to maintain said base, and said support in axial alinement.

In testimony whereof I affix my signature.
WARREN NOBLE.